(12) United States Patent
Wilson et al.

(10) Patent No.: US 11,971,719 B2
(45) Date of Patent: Apr. 30, 2024

(54) PERFORMING LOW PROFILE OBJECT DETECTION ON A MOWER

(71) Applicant: FireFly Automatix, Inc., Salt Lake City, UT (US)

(72) Inventors: Eli D. Wilson, Salt Lake City, UT (US); Steven R. Aposhian, Farmington, UT (US); Eric E. Aston, Farmington, UT (US); William M. Decker, Salt Lake City, UT (US)

(73) Assignee: FireFly Automatix, Inc., Salt Lake City, UT (US)

( * ) Notice: Subject to any disclaimer, the term of this patent is extended or adjusted under 35 U.S.C. 154(b) by 347 days.

(21) Appl. No.: 16/892,780

(22) Filed: Jun. 4, 2020

(65) Prior Publication Data
US 2021/0382490 A1  Dec. 9, 2021

(51) Int. Cl.
*G05D 1/00* (2024.01)
*A01D 34/00* (2006.01)
*A01D 101/00* (2006.01)
*G01V 9/00* (2006.01)

(52) U.S. Cl.
CPC ......... *G05D 1/0214* (2013.01); *A01D 34/008* (2013.01); *G01V 9/00* (2013.01); *G05D 1/0246* (2013.01); *A01D 2101/00* (2013.01)

(58) Field of Classification Search
None
See application file for complete search history.

(56) References Cited

U.S. PATENT DOCUMENTS

| | | | |
|---|---|---|---|
| 2017/0091591 A1* | 3/2017 | Fong | G06K 9/6215 |
| 2018/0338415 A1 | 11/2018 | Wyatt et al. | |
| 2019/0075724 A1 | 3/2019 | Becke et al. | |
| 2019/0108384 A1* | 4/2019 | Wang | G06V 20/49 |
| 2019/0114804 A1 | 4/2019 | Sundaresan et al. | |
| 2019/0130220 A1* | 5/2019 | Zou | G06K 9/6274 |
| 2019/0137290 A1* | 5/2019 | Levy | G05D 1/0214 |
| 2019/0160675 A1* | 5/2019 | Paschall II | G05D 1/0214 |
| 2019/0227570 A1* | 7/2019 | Miller | G05D 1/0225 |
| 2019/0243364 A1 | 8/2019 | Cohen | |
| 2019/0250627 A1* | 8/2019 | Witt | G05D 1/0231 |
| 2019/0346848 A1 | 11/2019 | Zhou et al. | |
| 2020/0012281 A1* | 1/2020 | Jaegal | G05D 1/0088 |
| 2020/0122711 A1* | 4/2020 | Chen | B60W 40/105 |
| 2020/0211217 A1* | 7/2020 | Cairl | G05D 1/024 |

* cited by examiner

*Primary Examiner* — Jaime Figueroa
*Assistant Examiner* — Arslan Azhar
(74) *Attorney, Agent, or Firm* — Kirton McConkie; Brian Tucker

(57) ABSTRACT

Low profile object detection can be performed on mowers or other vehicles that may be autonomous. An autonomy controller can be employed on a mower to receive and process sensor data for a detection area to determine whether an object may be present in a region of interest within the detection area. When the autonomy controller determines that an object may be present, it can cause the ground speed of the mower to be slowed and can commence buffering region of interest sensor data over a period of time. The autonomy controller can process the buffered region of interest sensor data to determine whether an object is present in the region of interest, and if so, can alter the path of the mower appropriately.

24 Claims, 12 Drawing Sheets

PERFORMING LOW PROFILE OBJECT DETECTION ON A MOWER

CROSS-REFERENCE TO RELATED APPLICATIONS

N/A

BACKGROUND

Expansive grassy areas such as sod farms, golf courses, sports fields, parks, etc. are oftentimes cut frequently using large mowers. For example, a sod farm may be cut multiple times a week. Labor costs associated with such mowing can be significant.

With recent advancements in automation, some mower manufacturers have developed autonomous mowers. These autonomous mowers can be driven with minimal oversight using GPS or other geolocation techniques thereby reducing the labor costs associated with frequent mowing. Like many automobiles, an autonomous mower will typically employ sensors to detect the presence of objects in the mower's path. For example, an autonomous mower may include a sensor to detect large objects such as people, animals, trees, equipment, etc. to prevent collisions with such objects. The detection of these objects on a mower can be accomplished in much the same manner as such objects are detected on automobiles.

With mowers, however, there are unique difficulties because mowers operate on grass and include mower blades that pass mere inches above the ground. A very small object, which an automobile may simply drive over and may safely ignore, could pose a significant problem to a mower. For example, if a mower drives over a sprinkler line, a mower deck may be destroyed. Additionally, it is not uncommon for these relatively small objects to be covered at least partially by the grass. For example, grass to be cut could have grown around an old sprinkler line making it very difficult to detect that the sprinkler line is the mower's path. Similar difficulties may exist for other types of autonomous equipment (or vehicles) that interface directly with or immediately above the ground such as sod harvesters, combine harvesters, forage harvesters, plows, cultivators, seeders, etc.

BRIEF SUMMARY

Embodiments of the present invention extend generally to methods for performing low profile object detection on mowers or other off-highway vehicles that may be autonomous, to circuitry or computer program products for performing such methods, and to mowers and other off-highway vehicles that are configured to perform such methods. An autonomy controller can be employed on a mower to receive and process sensor data for a detection area to determine whether an object may be present in a region of interest within the detection area. When the autonomy controller determines that an object may be present, it can cause the ground speed of the mower to be slowed and can commence buffering region of interest sensor data over a period of time. The autonomy controller can process the buffered region of interest sensor data to determine whether an object is present in the region of interest, and if so, can alter the path of the mower appropriately. If the autonomy controller is unable to determine whether an object is present in the region of interest, it can notify an external system to receive feedback on whether to allow the mower to proceed along its path.

In some embodiments, the present invention may be implemented as a mower that includes a main body, one or more mower decks supported by the main body, one or more sensors that provide sensor data for a detection area that extends in front of the one or more mower decks, an autonomy controller that receives the sensor data for the detection area from the one or more sensors and a machine controller that controls a ground speed and direction of the mower. The autonomy controller can be configured to perform a method for detecting an object within the detection area. This method can include: processing the sensor data for the detection area to determine that an object may be present in a region of interest within the detection area; in response to determining that an object may be present in a region of interest within the detection area, causing the machine controller to slow the ground speed of the mower; buffering region of interest sensor data received over a period of time; and processing the buffered region of interest sensor data to determine whether an object is present in the region of interest.

In some embodiments, the present invention may be implemented by an autonomy controller of a vehicle as a method for detecting a low profile object. The autonomy controller can receive, from one or more sensors, sensor data for a detection area. The autonomy controller can process the sensor data for the detection area to determine that an object may be present in a region of interest within the detection area. In response to determining that an object may be present in a region of interest within the detection area, the autonomy controller can cause a ground speed of the vehicle to be slowed. In conjunction with causing the ground speed of the vehicle to be slowed, the autonomy controller can buffer region of interest sensor data received over a period of time. The autonomy controller can then process the buffered region of interest sensor data to determine whether an object is present in the region of interest.

In some embodiments, the present invention may be implemented as a vehicle that includes a main body, a first sensor and a second sensor that each provide sensor data for a detection area that extends in front of the main body, an autonomy controller that receives the sensor data for the detection area from the first and second sensors and a machine controller that controls a ground speed of the vehicle. The autonomy controller is configured to perform a method for detecting an object within the detection area which includes: receiving, from one or both of the first and second sensor, sensor data for the detection area; processing the sensor data for the detection area to determine that an object may be present in a region of interest within the detection area; in response to determining that an object may be present in a region of interest within the detection area, causing the machine controller to slow the ground speed of the vehicle; buffering region of interest sensor data received over a period of time from the second sensor; and processing the buffered region of interest sensor data to determine whether an object is present in the region of interest.

In some embodiments, the present invention may be implemented as a method for building a database of labeled images for use in detecting a low profile object in a path of a vehicle. Sensor data for a detection area may be received from one or more sensors on a vehicle. The sensor data for the detection area may be processed to determine that an object may be present within the detection area. In response to determining that an object may be present within the detection area, a ground speed of the vehicle may be slowed. In conjunction with causing the ground speed of the vehicle to be slowed, a feed from a camera of the vehicle may be provided to an external system. The external system may then display the feed and receive user input that labels an object contained in the feed. The feed with the labeled object may then be stored in a database.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

In this specification and the claims, the term "mower" should be construed as equipment that can be propelled across the ground and that is capable of cutting grass. One of skill in the art would understand that there are many different types and configurations of mowers. Therefore, although the following description will employ an example where the mower is in the form of a tractor that supports a number of mower decks, it should be understood that any type of mower could be configured to implement embodiments of the present invention. The term "mower deck" should be construed as a component of a mower that houses one or more cutting blades. A mower that is configured to implement embodiments of the present invention may include one or more mower decks.

Figure 1:
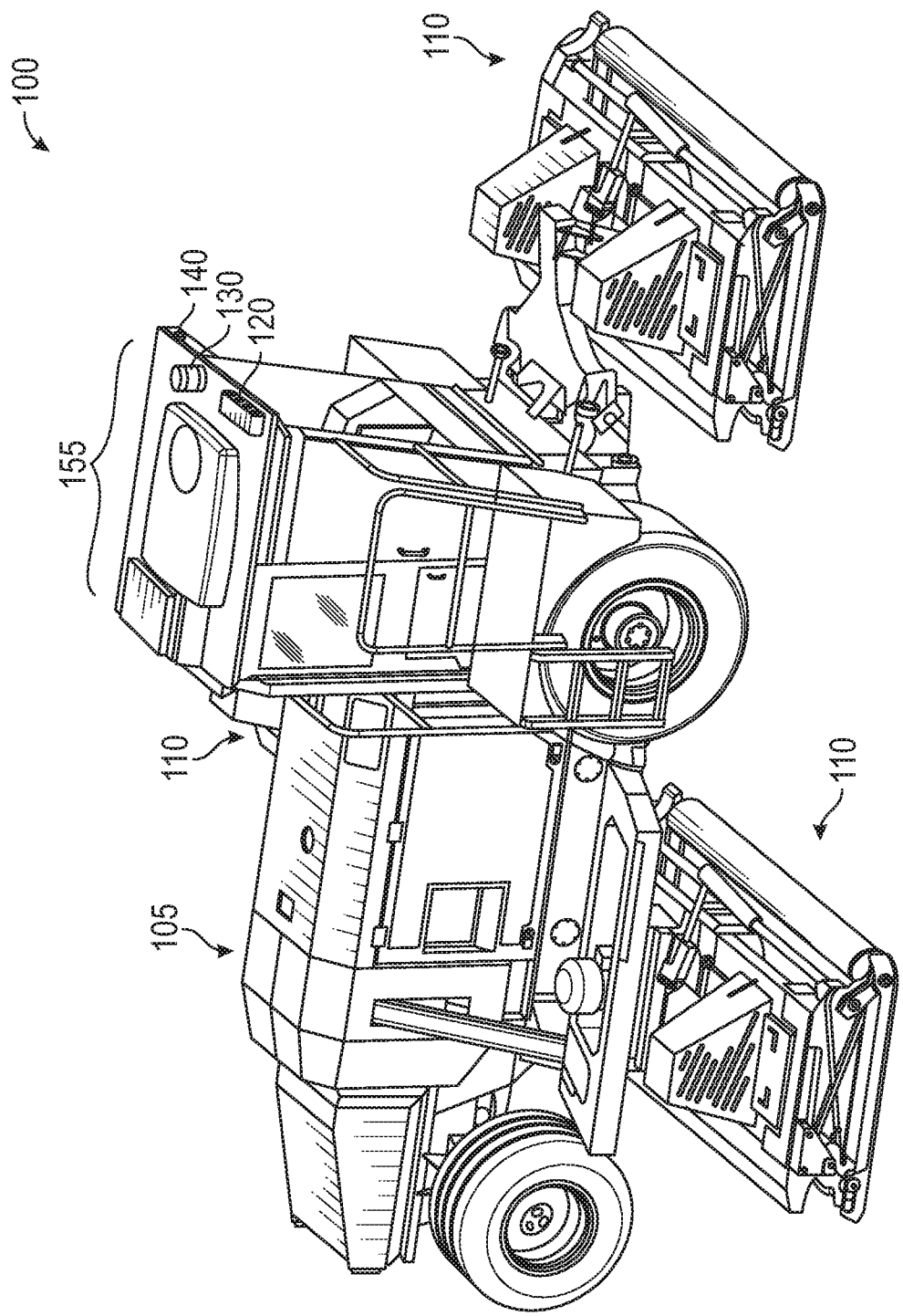
FIG. 1 illustrates an example of a mower that is configured in accordance with one or more embodiments of the present invention.

FIG. 1 provides one example of a mower 100 that is configured in accordance with embodiments of the present invention. Mower 100 is in the form of a tractor having a main body 105 from which three mower decks 110 are supported. A cab 155 is positioned towards a front of main body 105 and may be configured to house an operator. However, embodiments of the present invention are directed to enabling mower 100 to be autonomous, and therefore, no operator needs to be present within cab 155 during operation.

In the depicted example, a first sensor 120, a second sensor 130 and a camera 140 are positioned on cab 155. This positioning, however, is merely one example. In other examples, the sensors and/or camera could be positioned inside cab 155, at a different location on main body 105, on mower decks 110, etc. In some embodiments, positioning the sensors on or in cab 155 as opposed to on or near mower decks 110 can minimize the vibrational forces the sensors will experience.

The number and/or type of sensors may also vary. In the depicted example, it will be assumed that first sensor 120 is a 2D sensor and that second sensor 130 is a 3D sensor. The use of these different types of sensors is described below. It will also be assumed that the horizontal ranges of first sensor 120 and second sensor 130 are sufficient to encompass the cutting width of mower decks 110 (i.e., the combined width of the three mower decks). However, if either sensor did not have a sufficient horizontal range, multiple sensors of the same type could be employed. For example, first sensor 120 or second sensor 130 could be replaced with two sensors where each sensor is oriented to cover the left or right side of mower 100's cutting path. In some embodiments, multiple sensors could be employed even when their ranges overlap. Accordingly, the present invention should not be limited to embodiments that employ any particular number and/or type of sensor.

Camera 140 can be mounted anywhere on mower 100 that will enable a video feed of the mower's cutting path to be presented to a user. In the depicted example, a single camera 140 is mounted to the front of cab 155. However, in other embodiments, one or more cameras 140 could be mounted on one or more of mower decks 110, on another portion of main body 105 or at some other position.

Figure 2:
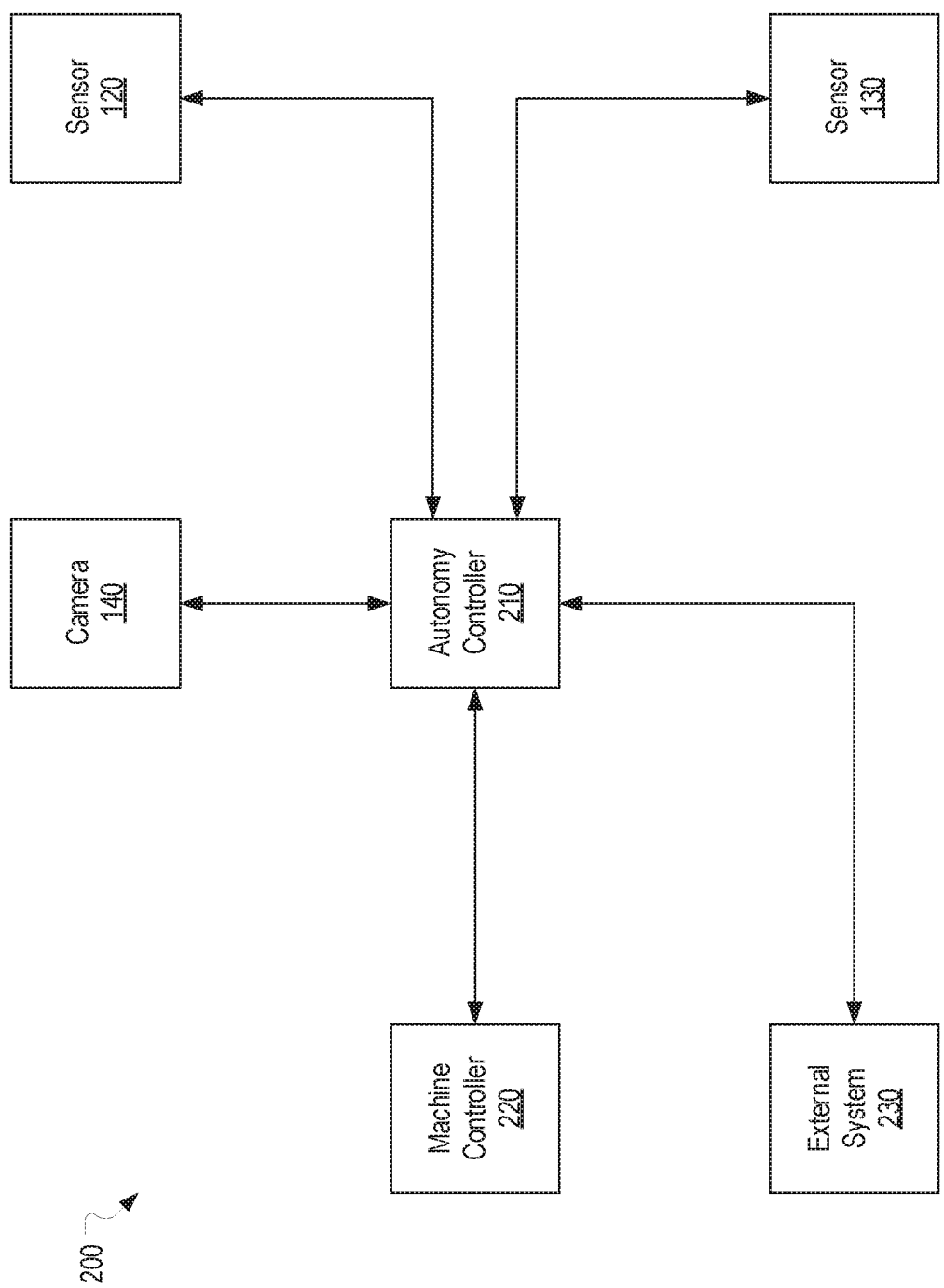
FIG. 2 is a block diagram representing various computing components that may be included on a mower of FIG. 1 to enable the mower to implement one or more embodiments of the present invention.

FIG. 2 illustrates an example of a control system 200 that may be employed on a mower, such as mower 100, to enable the mower to perform low profile object detection in accordance with embodiments of the present invention. Control system 200 includes an autonomy controller 210, a machine controller 220, sensor 120, sensor 130 and camera 140, all of which may be incorporated into or on mower 100, and an external system 230.

Autonomy controller 210 can be implemented with any suitable hardware- and/or software-based circuitry including, but not limited to, a central processing unit, a microprocessor, a microcontroller, a field programming gate array, an application-specific integrated circuit, a system on a chip, etc. Autonomy controller 210 is coupled to sensor 120 and sensor 130 (or any other sensors employed on a mower) to receive and process sensor data that is generated as mower 100 traverses the ground. In addition to receiving sensor data, autonomy controller 210 can provide control signals to some or all of sensor 120, sensor 130, camera 140, machine controller 220 and external system 230 as described below.

Machine controller 220 can represent the components that drive mower 100. In some embodiments, machine controller 220 can represent a drive-by-wire system. Of primary relevance to the present invention, machine controller 220 can be configured to control the ground speed of mower 100, including being able to stop mower 100, and may also be configured to change the path of mower 100 in response to control signals received from autonomy controller 210.

In some embodiments, sensor 120 may be a 2D sensor. For purposes of this specification and the claims, a 2D sensor may be construed in accordance with its customary meaning such as a sensor that employs variations in heat (e.g., a thermography sensor), reflectivity (e.g., a LiDAR intensity sensor), color (an RGB sensor), etc. to detect objects that may be present in the sensor's field of view. In some embodiments, sensor 130 may be a 3D sensor. For purposes of this specification and the claims, a 3D sensor may be construed in accordance with its customary meaning such as a sensor that incorporates depth measurements in its sensor data such as time of flight sensors (e.g., LiDAR, RADAR, Ultrasonic sensors) that provide 2D reflectivity-based sensor data and incorporate depth measurements based on the time at which a reflected signal is received and stereo cameras (e.g., RGB-D sensors) that employ spaced cameras and perform trigonometric calculations on pixel values produced by the spaced cameras to determine depth. These sensors are provided as examples only, and embodiments of the present invention could be implemented using any sensor or combination of sensors that enable the functionality described below.

External system 230 may represent any computing device that is capable of receiving and displaying a video feed generated by camera(s) 140 and that is capable of providing feedback/input to autonomy controller 210. In one example, external system 230 could include a computing device (e.g., a smart phone or tablet with an app, a desktop or mobile device logged into a website, a dedicated device, etc.) that an operator has registered with autonomy controller 210 or otherwise associated with mower 100. In such cases, the operator (e.g., a manager of a sod farm, golf course, park, etc.) could employ external system 230 to monitor the operation of mower 100 when it is autonomous or even while riding in mower 100. In another example, external system 230 could be a cloud-based artificial intelligence engine that receives the video feed generated by camera(s) 140 and/or sensor data. In any case, in some embodiments, external system 230 can be employed to prompt an individual (or to employ artificial intelligence) to determine whether an object is present in mower 100's path when the low profile object detection techniques of the present invention do not confirm the presence of an object with a threshold level of certainty.

Figure 3A:
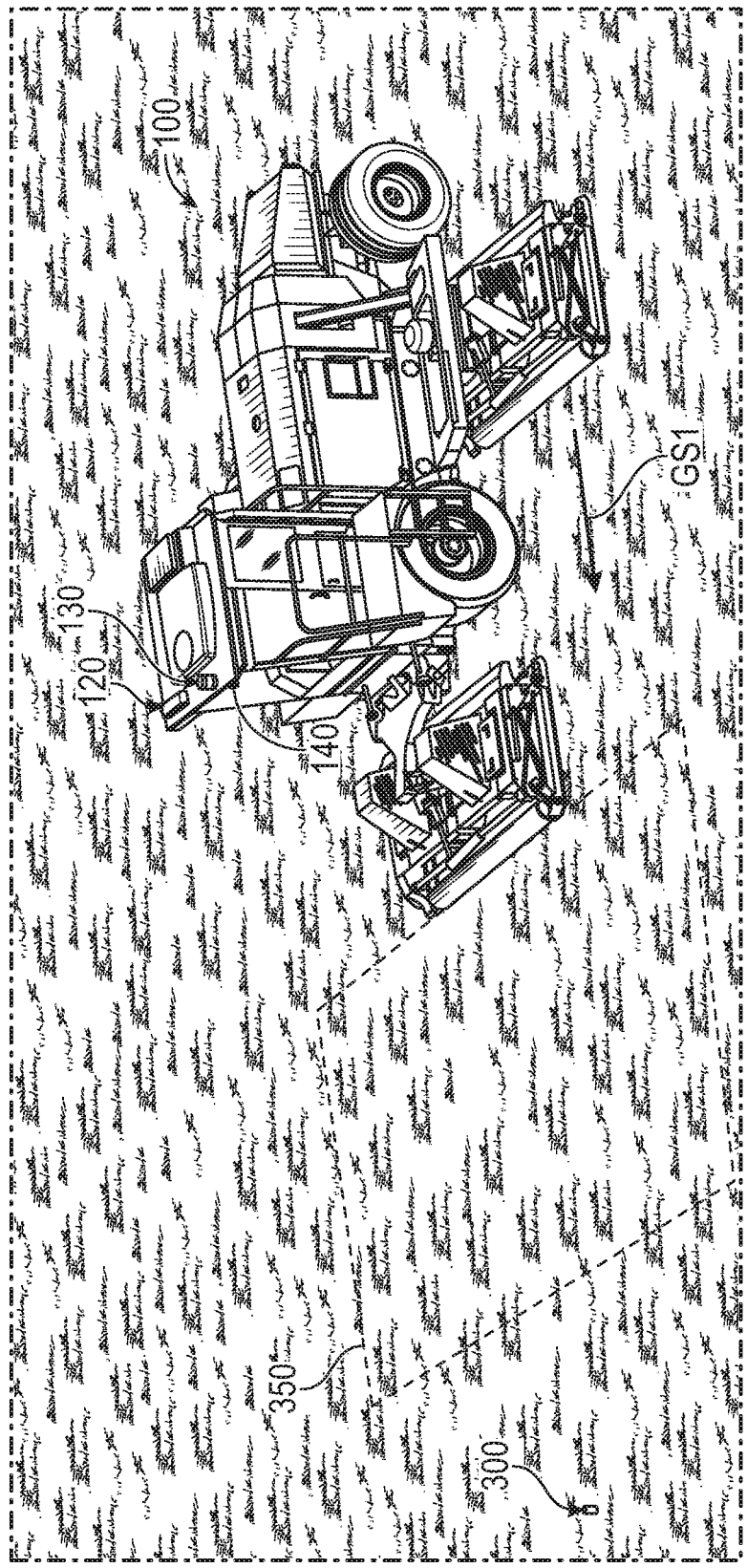
FIGS. 3A-3C represent how the mower of FIG. 1 can be controlled while performing low profile object detection in accordance with one or more embodiments of the present invention.
Figure 3B:
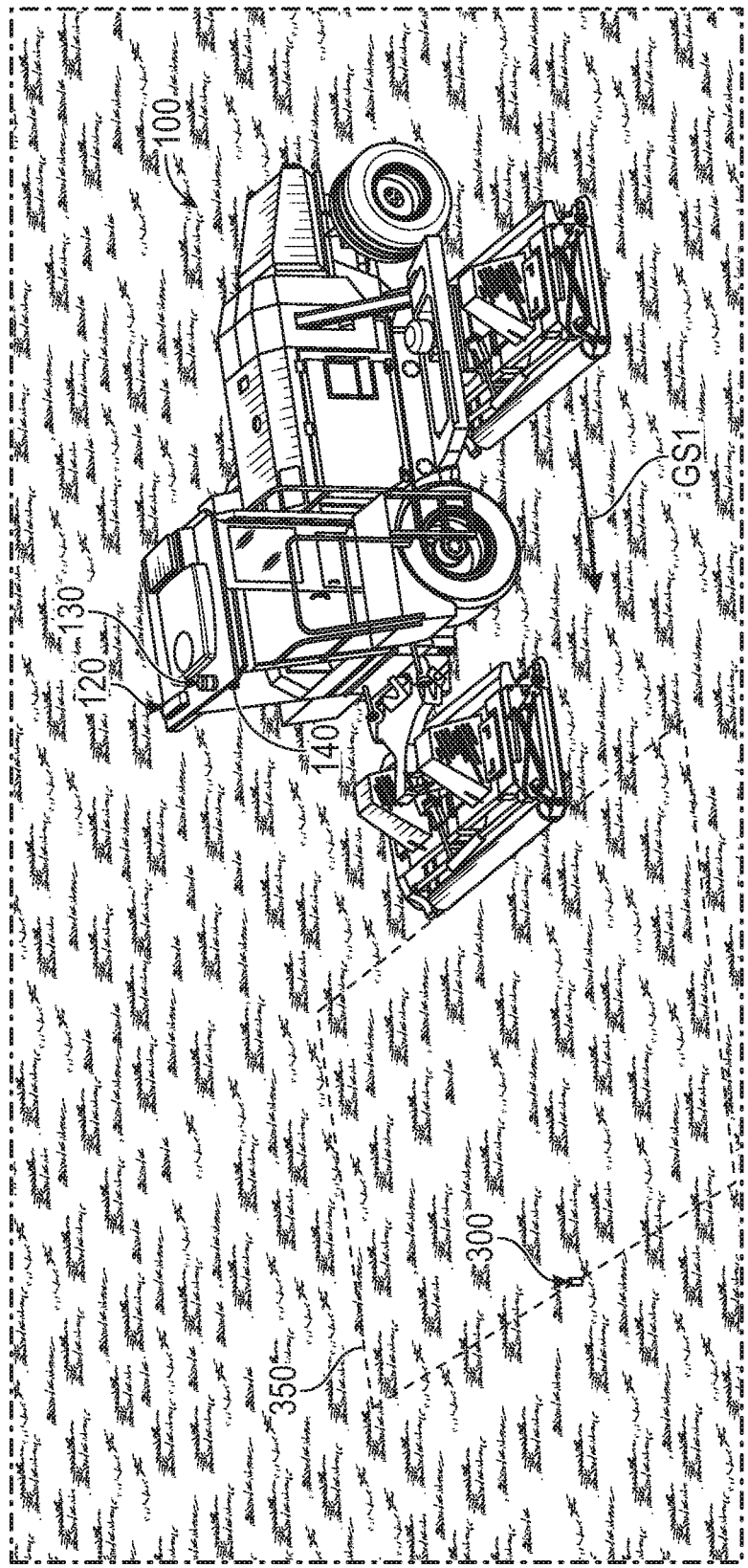
Figure 3C:

FIGS. 3A-3C provide an example where mower 100 approaches a low profile object while mowing and can provide context for the subsequent description of low profile object detection techniques that autonomy controller 210 can perform. In FIG. 3A, mower 100 is shown as travelling at a ground speed ($GS_1$) while cutting a grass field 300. In some embodiments, autonomy controller 210 can cause machine controller 220 to maintain mower 100 at this ground speed when no objects are detected in mower 100's path.

While cutting, sensors 120 and 130 can generate sensor data over a detection area 350 that is in front of mower decks 110. In other words, detection area 350 encompasses the section of grass that mower 100 is about to cut. The location of detection area 350 is one example only. In some cases, detection area 350 may extend rearwardly up to each of mower decks 110 or may have any other shape or position that encompasses the path that mower 100 is about to traverse. In the depicted embodiment, it is assumed that both sensors 120 and 130 are generating sensor data over detection area 350. In other words, the field of view of sensor 120 and sensor 130 correspond with detection area 350. Accordingly, autonomy controller 210 can receive both 2D sensor data and 3D sensor data for detection area 350.

In FIG. 3A, a low profile object 300 (e.g., a piece of rebar that is sticking up from the ground) is shown in mower 100's path but has not yet entered detection area 350. In contrast, in FIG. 3B, it is assumed that mower 100 has advanced to the point where low profile object 300 has entered detection area 350. Accordingly, the sensor data that sensors 120 and 130 provide to autonomy controller 210 may reflect the presence of low profile object 300. However, given that low profile object 300 may stick up only slightly above the grass, may be the same temperature as the grass, may have a similar color as the grass, etc., it may be very difficult to determine from the sensor data that low profile object 300 is present.

To detect the presence of low profile objects with sufficient accuracy to avoid running them over or having to unnecessarily stop or alter the path of the mower, autonomy controller 210 can perform low profile object detection techniques as described in detail below. As part of such techniques, and as represented in FIG. 3C, autonomy controller 210 can instruct machine controller 220 to cause mower 100 to travel at a slower ground speed ($GS_2$) when autonomy controller 210 suspects that a low profile object may be present in mower 100's path. While traveling at the slower ground speed, sensors 120 and 130 may continue to produce sensor data encompassing the detection area, but autonomy controller 210 can alter which sensor data sensor 120 and/or 130 provides as described below.

Figure 4A:
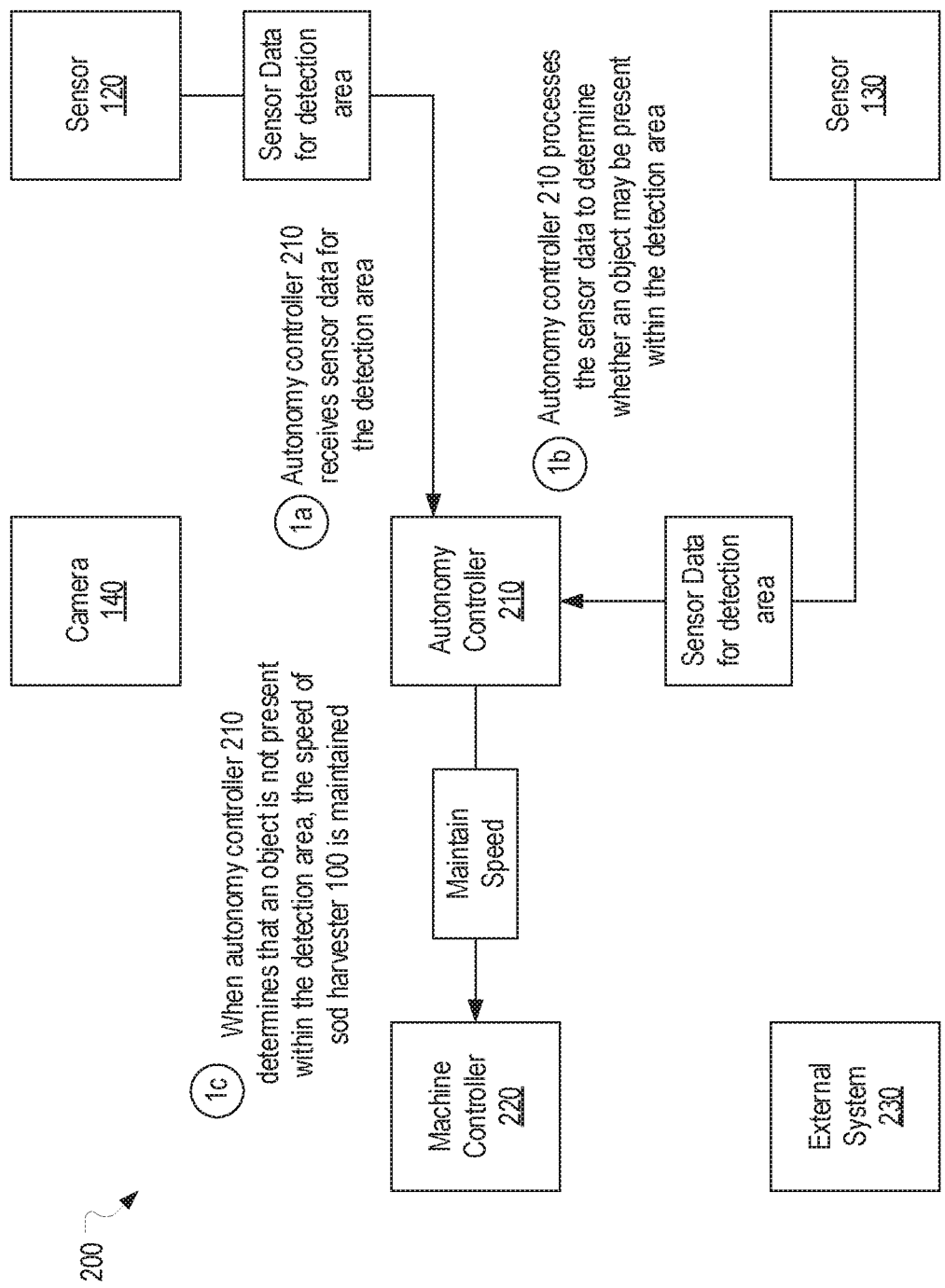
FIGS. 4A-4C illustrate a sequence of steps representing how the computing components of FIG. 2 can be employed to perform low profile object detection in accordance with one or more embodiments of the present invention.
Figure 4B:
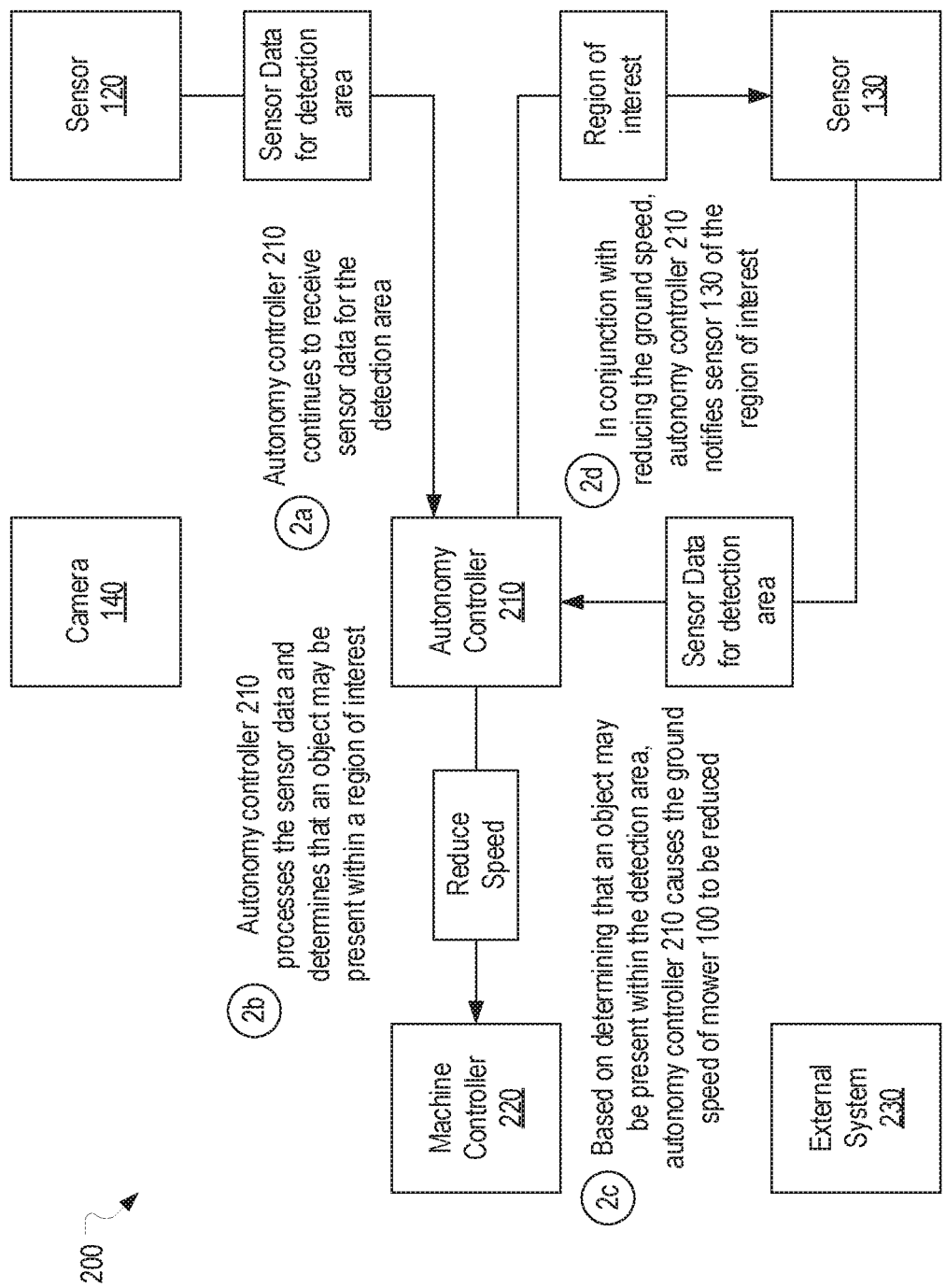
Figure 4C:
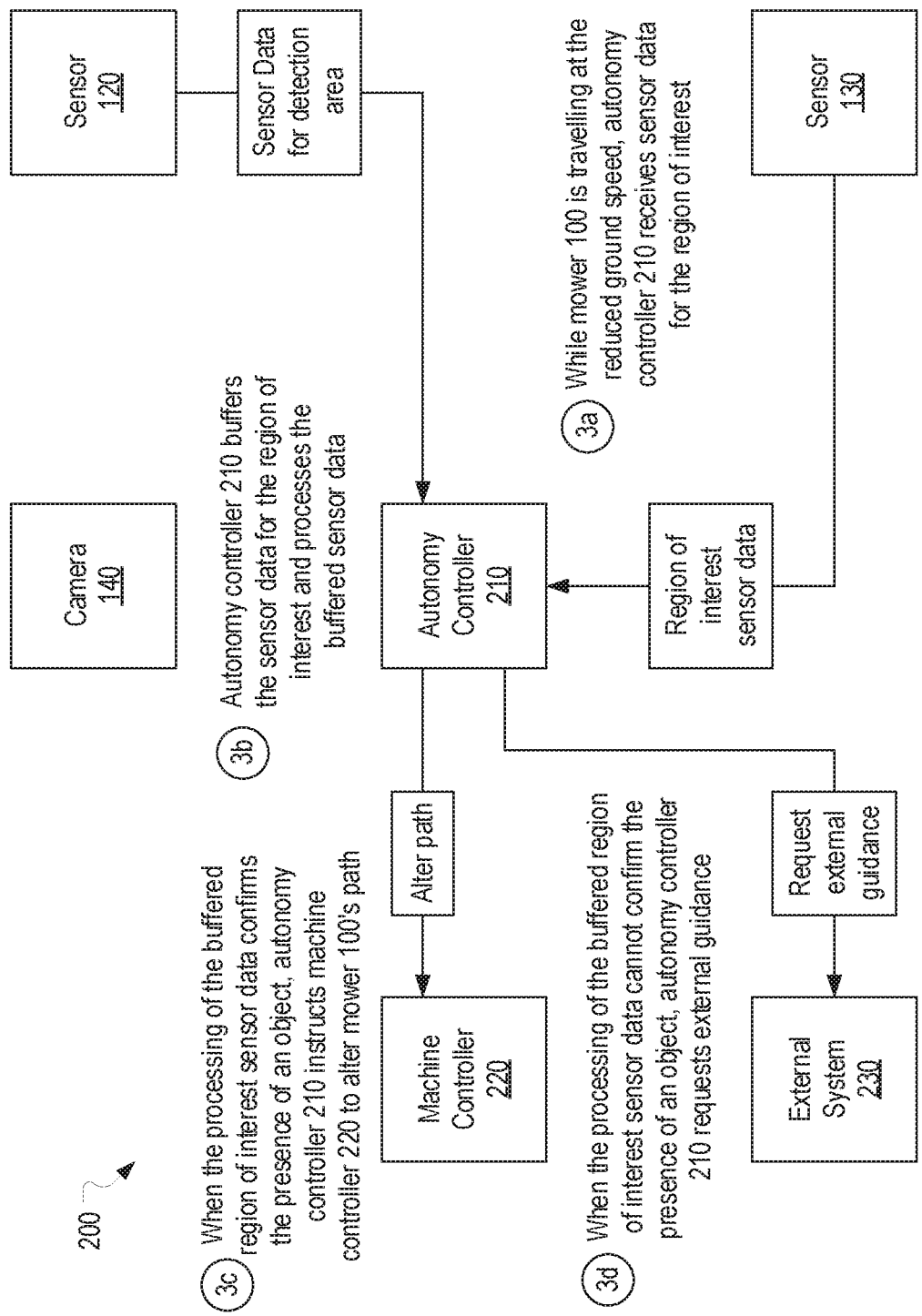

FIG. 4A-4C represent functionality that control system 200 can perform during the sequence depicted in FIGS. 3A-3C. In step 1a shown in FIG. 4A, autonomy controller 210 receives sensor data for detection area 350 from sensors 120 and 130. In step 1b, autonomy controller 210 processes the sensor data to determine whether an object, and particularly a low profile object, may be present in detection area 350. Step 1b could entail processing the sensor data from both sensors 120 and 130 or processing the sensor data from only one of sensors 120 or 130. For example, in some embodiments, autonomy controller 210 could process sensor data from sensor 120 (e.g., a 2D sensor) in step 1b to determine whether an object may be present. In embodiments where sensor 120 is a 2D sensor, autonomy controller 210 could determine that an object may be present within detection area 350, when there is a region within detection area 350 that exhibits a change in color, reflectivity, heat, etc. in excess of some defined threshold.

In step 1c, when autonomy controller 210 determines that an object is not present within the detection area, autonomy controller 210 can cause machine controller 220 to maintain the ground speed of mower 100. Autonomy controller 210 can perform steps 1a-1c repeatedly while mower 100 is travelling and while no object is detected in mower 100's path.

Turning to FIG. 4B, in step 2a, autonomy controller 210 continues to receive sensor data from sensors 120 and 130 as mower 100 travels at ground speed $GS_1$. It is assumed that mower 100 has approached low profile object 300 (i.e., low profile object 300 has entered detection area 350) and therefore, in step 2b, as autonomy controller 210 processes the sensor data for the detection area, it can determine that an object may be present within a "region of interest." This region of interest can be a portion of detection area 350 where the sensor data suggests that an object may be present. With reference to FIG. 3B, the region of interest could be the region within detection area 350 that immediately surrounds low profile object 300. In some embodiments, the size and/or shape of the region of interest may vary depending on the size and/or shape of the object that autonomy controller 210 has determined may be present. In other embodiments, a fixed size and/or shape of the region of interest (e.g., a one-foot square) may be used whenever autonomy controller 210 determines that an object may be present.

In step 2c, based on determining that an object may be present within detection area 350, autonomy controller 210 can cause machine controller 220 to reduce the ground speed of mower 100 to ground speed $GS_2$. In step 2d, in conjunction with reducing the ground speed of mower 100, autonomy controller 210 can also notify sensor 130 of the region of interest. For example, autonomy controller 210 can provide sensor 130 with fixed or relative coordinates, offsets or some other definition of where the region of interest is within detection area 350. Notably, sensor 130 may be a 3D sensor.

Turning to FIG. 4C, in response to autonomy controller 210 identifying the region of interest, sensor 130 can commence sending "region of interest sensor data" as opposed to sensor data for detection area 350. This region of interest sensor data is the sensor data that sensor 130 produces for the region of interest even though sensor 130 may still be generating sensor data for the entire detection area. In other words, in response to autonomy controller 210 specifying a region of interest, sensor 130 can commence sending a subset of the sensor data that it is generating. In other embodiments, rather than instructing sensor 130 to provide only region of interest sensor data, autonomy controller 210 may receive sensor data for detection area 350 and filter out any sensor data falling outside the region of interest.

As represented in FIG. 4C, sensor 120 may still generate and send sensor data for detection area 350 while sensor 130 is sending region of interest sensor data. This can enable autonomy controller 210 to continue to perform steps 1a-1c using the sensor data from sensor 120 to detect any other object that may enter detection area 350 while autonomy controller 210 processes the region of interest sensor data to confirm whether an object is present.

Because autonomy controller 210 has caused mower 100's ground speed to be slowed, low profile object 300 will remain in detection area 350 for a longer period of time. In other words, autonomy controller 210 will have more time to determine whether an object is actually present before either running over the object or having to stop the mower to avoid doing so. During this period of time, sensor 130 can continue to provide sensor data to autonomy controller 210 at the same rate (e.g., one sample per second). However, with sensor 130 providing only region of interest sensor data (or with autonomy controller 210 creating the region of interest sensor data by filtering out sensor data outside the region of interest), each sample will be much smaller. For example, sensor data for detection area 350 could include 1.5 million sample points per second, whereas region of interest sensor data may include a very small fraction of these sample points.

In step 3b, autonomy controller 210 buffers the region of interest sensor data that it receives from sensor 130 over a period of time. Because the region of interest sensor data is much smaller than the sensor data for detection area 350, autonomy controller 210 can buffer and subsequently process multiple samples of region of interest sensor data to determine whether an object is present in the region of interest. For example, with the slowing of the ground speed, autonomy controller 210 may receive and buffer ten samples of region of interest sensor data and then simultaneously process the ten buffered samples of region of interest sensor data to determine whether an object exists within the region of interest. This processing can be performed without stopping mower 100 or altering mower 100's path.

When autonomy controller 210's processing of the buffered region of interest sensor data confirms that an object is present in the region of interest, autonomy controller 210 can instruct machine controller 220 to alter mower 100's path to avoid running over the object. This altering of mower 100's path could entail steering mower 100 around the object, lifting one or more of mower decks 100, stopping mower 100, etc. Notably, the combination of slowing mower 100's ground speed and causing sensor 130 to provide region of interest sensor data enables autonomy controller 210 to accurately determine whether and how to alter mower 100's path without unnecessarily stopping mower 100. In other words, the low profile object detection techniques that autonomy controller 210 performs can minimize the occurrence of false positives which would otherwise degrade the efficiency of mower 100 that repeated and unnecessary stops would cause.

In some instances, autonomy controller 210 will not be able to determine with sufficient certainty whether an object is present in mower 100's path. In such cases, autonomy controller 210 can communicate with external system 230 to request external guidance. For example, autonomy controller 210 could send a notification to external system 230 to request that an operator view a live video feed from camera 140 and provide input identifying whether an object is present. Based on such input, autonomy controller 210 can instruct machine controller 220 to either proceed (e.g., when the input indicates that no object is present) or to alter mower 100's path (e.g., when the input indicates that an object is present). As another example, autonomy controller 210 could send the region of interest sensor data and/or the live video feed to an artificial intelligence engine where it could be processed using more processing resources than autonomy controller 210 can provide to thereby determine with greater accuracy whether to alter mower 100's path. An example of how an artificial intelligence engine may be employed is provided below.

Figure 5:
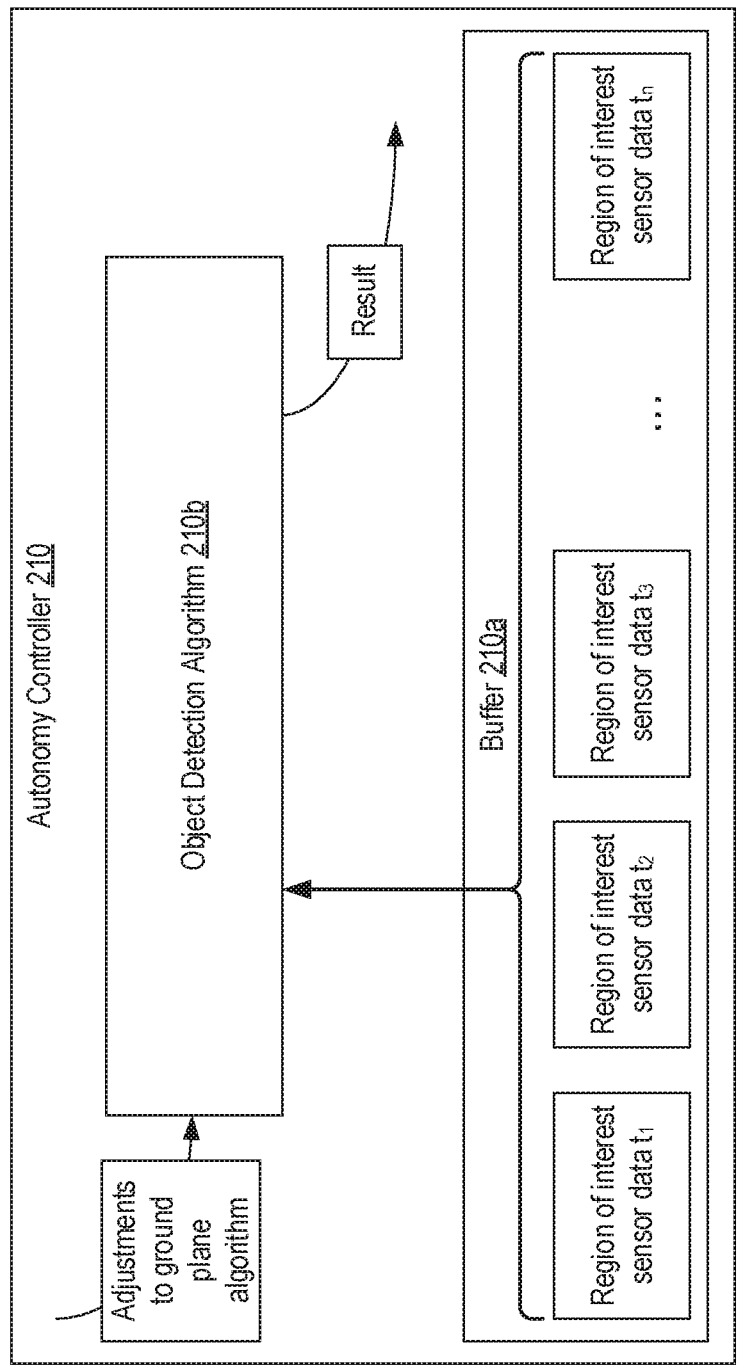
FIG. 5 illustrates how an autonomy controller can employ an object detection algorithm using region of interest sensor data that has been buffered over a period of time in accordance with one or more embodiments of the present invention.

FIG. 5 provides an example of how autonomy controller 210 can buffer and process region of interest sensor data. As shown, autonomy controller 210 can include a buffer 210a in which it stores sensor data that is to be processed. Prior to instructing sensor 130 to provide region of interest sensor data, autonomy controller 210 could store a single sample of sensor data for detection area 350 in buffer 210a and then process this single sample to determine whether an object may be present in detection area 350. In contrast, after instructing sensor 130 to provide region of interest sensor data, autonomy controller 210 can store multiple samples of region of interest sensor data that it receives over a period of time. In FIG. 5, buffer 210a is shown as storing region of interest sensor data received over a period of time from $t_1$ to $t_n$. Region of interest sensor data $t_1$ can represent the subset of the sensor data that sensor 130 produces at time $t_1$ where this subset is limited to the region of interest that autonomy controller 210 specified (e.g., the region immediately surrounding low profile object 300). Similarly, region of interest sensor data $t_n$ can represent the subset of the sensor data that sensor 130 produces at time $t_n$ where this subset is limited to the region of interest that autonomy controller 210 specified.

After buffering region of interest sensor data $t_1$ through $t_n$, autonomy controller 210 can input the buffered region of interest sensor data to an object detection algorithm 210b. Because object detection algorithm 210b simultaneously processes multiple samples that encompass the region of interest, the presence of an object can be detected with high accuracy. For example, region of interest sensor data $t_1$ could be produced while low profile object 300 is 50 feet from mower 100, region of interest sensor data $t_2$ could be produced when low profile object 300 is 48 feet from mower 100, and so on. Each of region of interest sensor data $t_1$ through $t_n$ would therefore provide a slightly different view of the region of interest and the potential object within that region. In embodiments where sensor 130 is a 3D sensor, each sample of region of interest sensor data will include depth measurements taken at a slightly different angle relative to the potential object. By simultaneously processing such depth measurements taken over the period of time at the various angles, object detection algorithm 210b can provide a highly accurate result indicating whether an object is present.

In some embodiments, autonomy controller 210 may also adjust a ground plane algorithm employed in object detection algorithm 210b while processing the region of interest sensor data. For example, while processing sensor data for detection area 350, object detection algorithm 210b may employ looser tolerances within its ground plane algorithm so that probable objects will be detected less frequently (e.g., to avoid too many false positives). In particular, detection area 350 will encompass areas that are farther from the sensors, and therefore the sensor data for such areas will have a low signal-to-noise ratio. This low signal-to-noise ratio will make it more difficult to distinguish an object from the ground. To avoid excessive false positives, object detection algorithm 210b can employ loose tolerances in its ground plane algorithm when processing sensor data for detection area 350.

Then, when transitioning to the processing of region of interest sensor data, object detection algorithm 210b can employ tighter tolerances within its ground plane algorithm to enhance the ability to distinguish a potential object from the surrounding area. Because mower 100 will be getting closer to the region of interest, the region of interest sensor data should exhibit an increasing signal-to-noise ratio (e.g., the signal-to-noise ratio should improve from time to $t_0$ time $t_n$). Autonomy controller 210 can leverage this increasing signal-to-noise ratio to better distinguish objects from the ground plane when processing region of interest sensor data without unreasonably increasing the number of false positives. As an example, tightening tolerances within the ground plane algorithm can cause object detection algorithm 210b to more accurately detect variations in the ground plane (e.g., dips or mounds in the field, intermittent slopes, etc.). In such cases, if an object is present in any area where the ground plane varies, the tightened tolerances within the ground plane algorithm will ensure that the varied ground plane will not hide the presence of the object. In contrast, without the tightened tolerances, the depth measurements attributable to the presence of the object may be hidden by depth measurements attributable to the varied ground plane (i.e., the object may appear as if it were part of the ground plane).

Figure 6A:
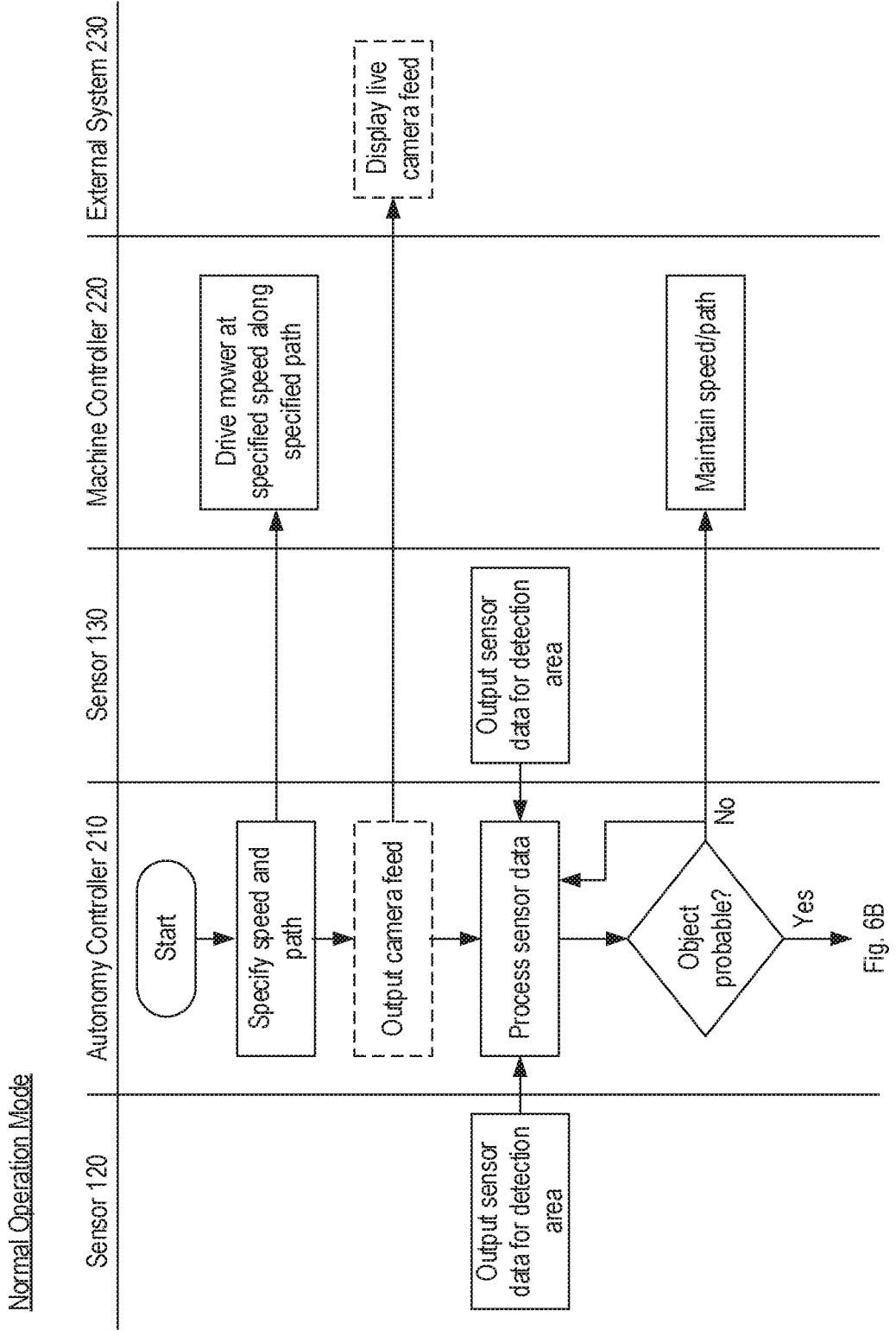
FIGS. 6A-6C provide a flow diagram representing how low profile object detection may be performed in one or more embodiments of the present invention.
Figure 6B:
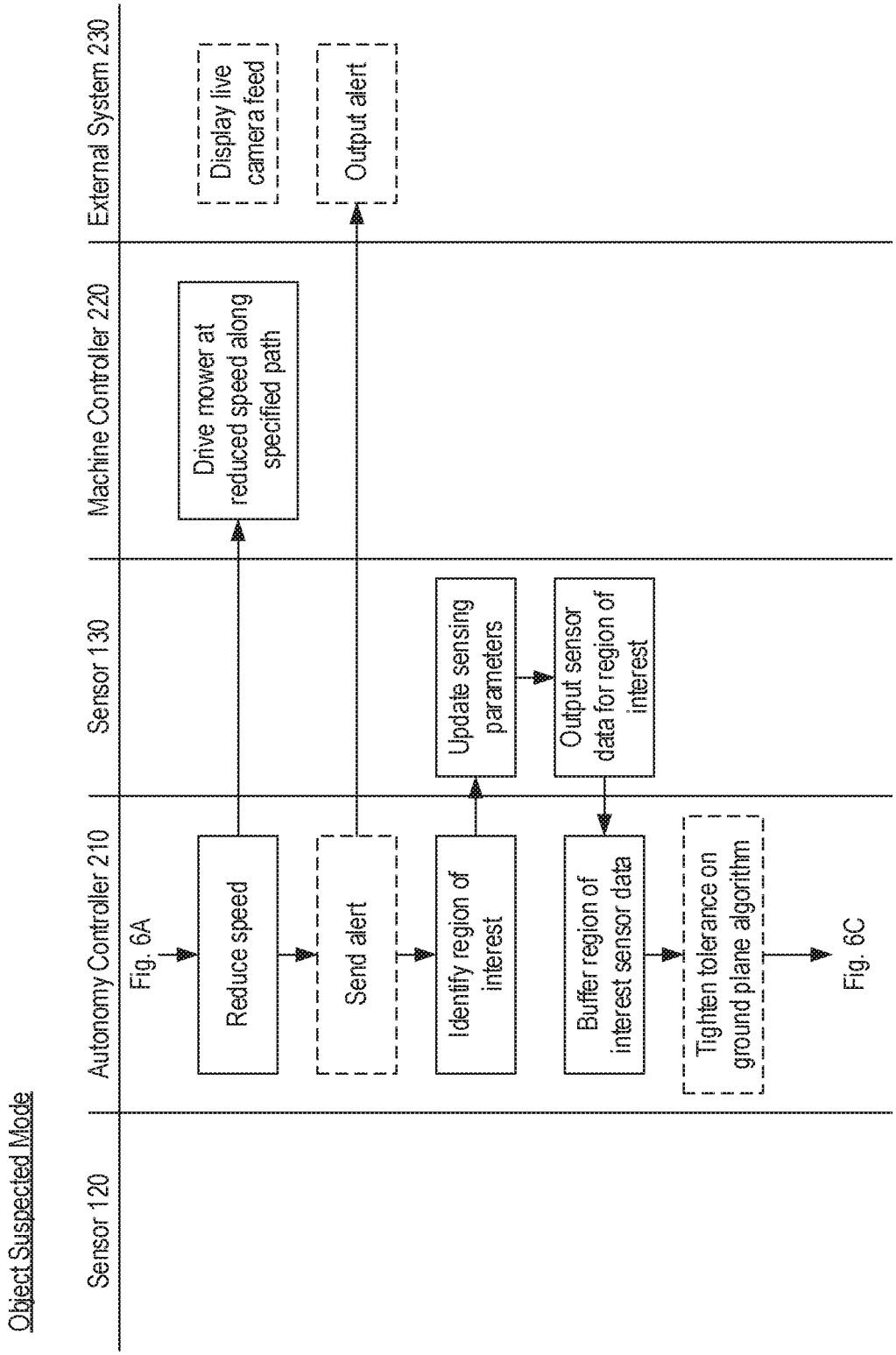
Figure 6C:
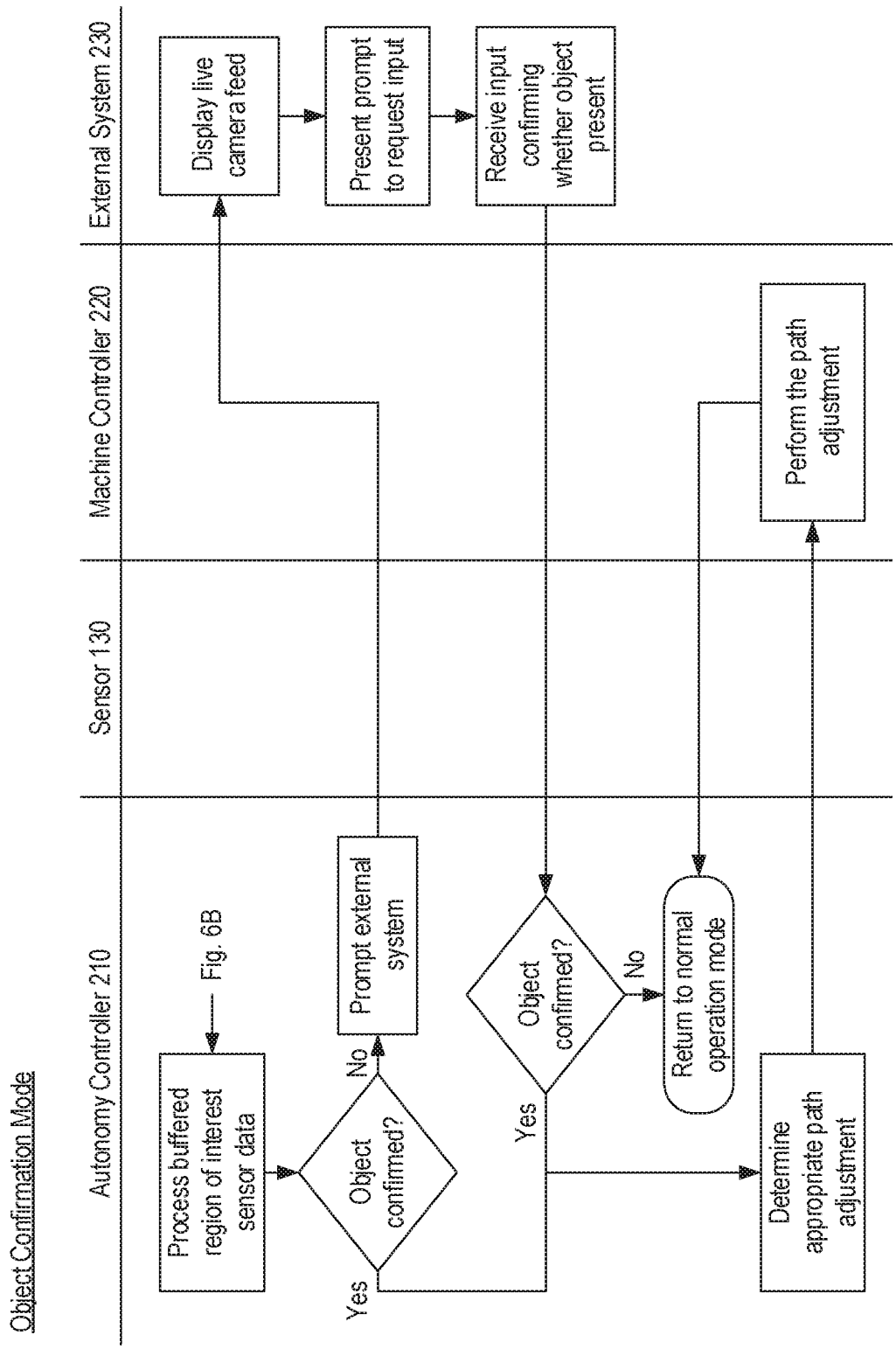

FIGS. 6A-6C provide a flow diagram representing how low profile object detection may be performed in one or more embodiments of the present invention. FIG. 6A represents functionality that autonomy controller 210 can perform in "normal operation mode." Autonomy controller 210 can initially provide a ground speed and path to machine controller 220 to enable machine controller 210 to drive mower 100 at the specified ground speed along the specified path. Although not shown, autonomy controller 210 may continuously provide a specified path to machine controller 220. Autonomy controller 210 may optionally output a video feed from camera 140 to external system 230. In some embodiments, autonomy controller 210 may output the video from in response to a request from external system 230 (e.g., when an operator requests to view the video feed). While mower 100 travels at the specified speed along the specified path, sensors 120 and 130 (or possibly just sensor 120) can provide sensor data for detection area 350 to autonomy controller 210. Autonomy controller 210 can process this sensor data for detection area 350 to determine whether an object may be present in mower 100's path. If not, autonomy controller 210 can cause machine controller 220 to maintain mower 100's ground speed and path and can continue to process the sensor data for detection area 350. In contrast, if autonomy controller 210 determines that an object may be present in mower 100's path, autonomy controller 210 can transition into an "object suspected mode" as represented in FIG. 6B.

As part of transitioning into object suspected mode, autonomy controller 210 can instruct machine controller 220 to reduce the ground speed of mower 100. In response, machine controller 220 can reduce the ground speed while maintaining the specified path. Autonomy controller 210 may optionally send an alert to external system 230. For example, autonomy controller 230 could notify an operator that it has entered object suspected mode and may optionally commence displaying a live video feed from camera 140 (if not already being displayed). Autonomy controller 210 can also identify the region of interest and specify the region of interest to sensor 130. In response, sensor 130 can update its sensing parameters to cause only the region of interest sensor data to be provided to autonomy controller 210. Alternatively, autonomy controller 210 may receive the sensor data for detection area 350 and apply a filter to create the region of interest sensor data. Autonomy controller 210 can then commence buffering the region of interest sensor data it receives over a period of time. Optionally, autonomy controller 210 can also tighten the tolerance on a ground plane algorithm that it employs as part of its object detection algorithm.

Autonomy controller 210 can then transition into an "object confirmation mode" as represented in FIG. 6C. With the region of interest sensor data buffered over a period of time, autonomy controller 210 can process the buffered region of interest sensor data (e.g., via object detection algorithm 210b). If this processing does not confirm the presence of an object, autonomy controller 210 can prompt external system 230 for input. This may entail displaying a live video feed (or images) from camera 140 on external system 230 to enable an operator to provide input indicating whether the operator believes an object is present. If the operator indicates that an object is not present, autonomy controller 210 can return to normal operation mode.

In contrast, if the processing of the buffered region of interest sensor data confirms the presence of an object or if the operator (or artificial intelligence engine) confirms the presence of an object, autonomy controller 210 can determine an appropriate path adjustment and instruct machine controller 220 to perform the path adjustment. Once the path adjustment is performed to avoid the object, autonomy controller 210 can return to normal operation mode.

Although embodiments of the present invention have been described in the context of a mower, control system 200 (or a similar control system) could be employed on other types of off-highway vehicles to perform low profile object detection techniques in the same or similar manner as described above.

In some embodiments, as part of presenting a live video feed or one or more images (generally "feed") from camera 140 on external system 230, external system 230 may also be configured to prompt the operator to label any suspected objects contained in the feed. For example, the operator could identify whether a suspected object is a pallet, sprinkler pipe, bad patch of grass, shadow, shovel, etc. The resulting labeled images, which may be generated from many different mowers in a variety of locations, could be stored in a database for subsequent use in training and implementing an artificial intelligence engine that can detect the presence of an object in a mower's path using the feed from a camera. Accordingly, in addition to employing operator input to determine an appropriate path adjustment for a particular mower in a particular scenario, control system 200 can be employed to build a database of labeled images that may enable an artificial intelligence engine to determine when path adjustments are necessary using only a feed from a camera.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. A mower comprising:
   a main body;
   one or more mower decks supported by the main body;
   one or more sensors that provide sensor data for a detection area that is in a path of the one or more mower decks such that the detection area changes as the mower travels, the detection area corresponding to a field of view of the one or more sensors;
   an autonomy controller that receives the sensor data for the detection area from the one or more sensors; and
   a machine controller that controls a ground speed of the mower;
   wherein the autonomy controller is configured to perform a method for detecting an object within the detection area, the method comprising:
     while the mower travels at a first ground speed at a first particular time in an area to be mowed, processing the sensor data for the detection area that is in the path of the one or more mower decks at the first particular time to determine that an object may be present in a region of interest within the detection area that is in the path of the one or more mower decks at the first particular time, wherein the sensor data for the detection area that is in the path of the one or more mower decks at the first particular time corresponds to the field of view of the one or more sensors at the first particular time, and wherein the region of interest corresponds to a portion of the field of view of the one or more sensors at the first particular time;
     in response to determining that an object may be present in the region of interest, causing the machine controller to slow the mower to a second ground speed to thereby slow a rate at which the one or more decks approaches the object that may be present in the region of interest;
     while the mower continues to travel at the second ground speed in the area to be mowed and the region of interest remains in the detection area that is in the path of the one or more mower decks at the first particular time, buffering multiple samples of region of interest sensor data received over a period of time after the first particular time as the mower approaches the region of interest, the region of interest sensor data being a subset of the sensor data for the detection area that is in the path of the one or more mower decks during the period of time, the subset of the sensor data encompassing the region of interest such that the multiple samples of region of interest sensor data comprise increasingly closer views of the region of interest as the mower approaches the region of interest; and
     while the mower continues to travel at the second ground speed in the area to be mowed and the region of interest remains in the detection area that is in the path of the one or more mower decks during the period of time, simultaneously processing the buffered multiple samples of region of interest sensor data which provide the increasingly closer views of the region of interest to determine whether an object is present in the region of interest.

2. The mower of claim 1, wherein the one or more sensors comprise one or more 2D sensors and one or more 3D sensors.

3. The mower of claim 2, wherein processing the sensor data for the detection area that is in the path of the one or more mower decks comprises processing sensor data for the detection area received from the one or more 2D sensors.

4. The mower of claim 3, wherein the autonomy controller receives the region of interest sensor data from the one or more 3D sensors.

5. The mower of claim 1, wherein, in response to determining that an object may be present in the region of interest within the detection area that is in the path of the one or more mower decks, the autonomy controller specifies the region of interest to the one or more sensors to cause the one or more sensors to provide the region of interest sensor data over the period of time.

6. The mower of claim 1, wherein, in response to determining that an object may be present in the region of interest within the detection area that is in the path of the one or more mower decks, the autonomy controller extracts the region of interest sensor data from the sensor data for the detection area that is in the path of the one or more mower decks received from the one or more sensors over the period of time.

7. The mower of claim 1, wherein the method further comprises:
   in response to determining that an object is present in the region of interest, causing the machine controller to alter a path of the mower.

8. The mower of claim 1, wherein the method further comprises:
   in response to determining that an object is not present in the region of interest, causing the machine controller to increase the ground speed of the mower.

9. The mower of claim 1, wherein the method further comprises:
   in response to failing to determine whether an object is present in the region of interest, notifying an external system.

10. The mower of claim 9, wherein notifying the external system comprises providing a live video feed from a camera on the mower.

11. The mower of claim 1, wherein processing the sensor data for the detection area that is in the path of the one or more mower decks comprises employing a first tolerance in a ground plane algorithm and wherein processing the buffered multiple samples of region of interest sensor data comprises employing a second tolerance in the ground plane algorithm, the second tolerance being tighter than the first tolerance.

12. The mower of claim 1, wherein the autonomy controller continues to process the sensor data for the detection area that is in the path of the one or more mower decks while processing the buffered multiple samples of region of interest sensor data.

13. A method, performed by an autonomy controller of a vehicle, for detecting a low profile object, the method comprising:
  receiving, from one or more sensors, sensor data for a detection area that is in a path of the vehicle at a first particular time such that the detection area changes as the vehicle travels, wherein the sensor data for the detection area that is in the path of the vehicle at the first particular time corresponds to a field of view of the one or more sensors at the first particular time;
  processing the sensor data for the detection area that is in the path of the vehicle at the first particular time to determine that an object may be present in a region of interest within the detection area that is in the path of the vehicle at the first particular time, wherein the region of interest corresponds to a portion of the field of view of the one or more sensors at the first particular time;
  in response to determining that an object may be present in the region of interest, causing a ground speed of the vehicle to be slowed to thereby slow a rate at which the vehicle approaches the object that may be present in the region of interest;
  in conjunction with causing the ground speed of the vehicle to be slowed, buffering multiple samples of region of interest sensor data received over a period of time after the first particular time as the vehicle approaches the region of interest, the region of interest sensor data being a subset of the sensor data for the detection area that is in the path of the vehicle during the period of time, the subset of the sensor data encompassing the region of interest such that the multiple samples of region of interest sensor data comprise increasingly closer views of the region of interest as the vehicle approaches the region of interest; and
  while the region of interest remains in the detection area that is in the path of the vehicle during the period of time, simultaneously processing the buffered multiple samples of region of interest sensor data which provide the increasingly closer views of the region of interest to determine whether an object is present in the region of interest.

14. The method of claim 13, wherein the vehicle is a mower.

15. The method of claim 13, wherein the sensor data for the detection area that is in the path of the vehicle is received from one or more 2D sensors.

16. The method of claim 15, wherein the region of interest sensor data is received from one or more 3D sensors.

17. The method of claim 16, wherein the sensor data for the detection area that is in the path of the vehicle is also received from the one or more 3D sensors.

18. The method of claim 13, wherein:
  in response to determining that an object may be present in the region of interest, the autonomy controller specifies the region of interest to the one or more sensors to cause the one or more sensors to provide the region of interest sensor data over the period of time; or
  in response to determining that an object may be present in the region of interest, the autonomy controller extracts the region of interest sensor data from the sensor data for the detection area that is in the path of the vehicle received from the one or more sensors over the period of time.

19. The method of claim 13, further comprising:
  in response to failing to determine whether an object is present in the region of interest, notifying an external system.

20. The method of claim 19, wherein notifying the external system comprises providing a feed from a camera of the vehicle to the external system, and wherein the method further comprises:
  displaying, by the external system, the feed;
  receiving, by the external system, user input that labels an object contained in the feed; and
  causing the feed with the labeled object to be stored in a database.

21. A vehicle comprising:
  a main body;
  a first sensor and a second sensor that each provide sensor data for a detection area that is in a path of the main body such that the detection area changes as the vehicle travels;
  an autonomy controller that receives the sensor data for the detection area that is in the path of the main body from the first and second sensors; and
  a machine controller that controls a ground speed of the vehicle;
  wherein the autonomy controller is configured to perform a method for detecting an object within the detection area that is in the path of the main body, the method comprising:
    receiving, from one or both of the first and second sensor, sensor data for the detection area that is in the path of the main body at a first particular time, wherein the sensor data for the detection area that is in the path of the main body at the first particular time corresponds to a field of view of one or both of the first and second sensor at the first particular time;
    processing the sensor data for the detection area that is in the path of the main body at the first particular time to determine that an object may be present in a region of interest within the detection area that is in the path of the main body, wherein the region of interest corresponds to a portion of the field of view of one or both of the first and second sensor at the first particular time;
    in response to determining that an object may be present in the region of interest, causing the machine controller to slow the ground speed of the vehicle;
    while the ground speed of the vehicle is slowed and while the region of interest remains in the detection area that is in the path of the main body at the first particular time, buffering multiple samples of region of interest sensor data received over a period of time after the first particular time from the second sensor, the region of interest sensor data being a subset of the sensor data for the detection area that is in the path of the main body during the period of time, the subset of the sensor data encompassing the region of interest such that the multiple samples of region of interest sensor data comprise increasingly closer views of the region of interest as the vehicle approaches the region of interest; and while the region of interest remains in the detection area that is in the path of the main body during the period of time, simultaneously processing the buffered multiple samples of region of interest sensor data which provide the increasingly closer views of the region of interest to determine whether an object is present in the region of interest.

22. A method for building a database of labeled images for use in detecting a low profile object in a path of a vehicle, the method comprising:

receiving, from one or more sensors on a vehicle, sensor data for a detection area that is in a path of the vehicle at a first particular time such that the detection area changes as the vehicle travels, wherein the sensor data for the detection area that is in the path of the vehicle at the first particular time corresponds to a field of view of the one or more sensors at the first particular time;

processing the sensor data for the detection area that is in the path of the vehicle at the first particular time to determine that an object may be present in a region of interest within the detection area that is in the path of the vehicle at the first particular time, wherein the region of interest corresponds to a portion of the field of view of the one or more sensors at the first particular time;

in response to determining that an object may be present in the region of interest, causing a ground speed of the vehicle to be slowed to thereby slow a rate at which the vehicle approaches the object that may be present in the region of interest;

in conjunction with causing the ground speed of the vehicle to be slowed, buffering multiple samples of region of interest sensor data received over a period of time after the first particular time as the vehicle approaches the region of interest, the region of interest sensor data being a subset of the sensor data for the detection area that is in the path of the vehicle during the period of time, the subset of the sensor data encompassing the region of interest such that the multiple samples of region of interest sensor data comprise increasingly closer views of the region of interest as the vehicle approaches the region of interest;

while the region of interest remains in the detection area that is in the path of the vehicle during the period of time, simultaneously processing the buffered multiple samples of region of interest sensor data which provide the increasingly closer views of the region of interest to determine whether an object is present in the region of interest;

upon determining that an object may be present in the region of interest, providing a feed from a camera of the vehicle to an external system;

displaying, by the external system, the feed;

receiving, by the external system, user input that labels an object contained in the feed;

storing the feed with the labeled object in a database; and using the feed with the labeled object to train and implement an artificial intelligence engine that is configured to detect objects in a path of the vehicle using a camera.

23. The method of claim 22, wherein the vehicle is a mower.

24. The method of claim 22, wherein the feed comprises one or more images.

* * * * *